United States Patent [19]

Heurteux

[11] Patent Number: 5,037,258

[45] Date of Patent: Aug. 6, 1991

[54] FLOATING BARREL NUT ASSEMBLY DEVICE

[75] Inventor: Bernard Heurteux, Versoix, France

[73] Assignee: Shur-Lok International S.A., Petit-Rechain, Belgium

[21] Appl. No.: 500,133

[22] Filed: Mar. 28, 1990

[30] Foreign Application Priority Data

Mar. 29, 1989 [FR] France .................. 89 04080

[51] Int. Cl.$^5$ .............................................. F16B 37/00
[52] U.S. Cl. ................................... 411/104; 411/85; 411/537
[58] Field of Search ................ 411/84, 85, 104, 432, 411/537

[56] References Cited

U.S. PATENT DOCUMENTS

| | | | |
|---|---|---|---|
| 2,789,457 | 4/1957 | Allen | 411/537 |
| 3,208,496 | 9/1965 | Phelan | 411/104 |
| 3,220,289 | 11/1965 | Farekas | 411/537 |
| 3,322,177 | 5/1967 | Phelan | 411/104 |
| 4,119,130 | 10/1978 | Berecz | |
| 4,861,207 | 8/1989 | Do | 411/104 |
| 4,886,407 | 12/1989 | Hargin | 411/104 |

Primary Examiner—Neill R. Wilson
Attorney, Agent, or Firm—Burns, Doane, Swecker & Mathis

[57] ABSTRACT

The device comprises a nut (4) floatingly housed in a seat made in a barrel (3) of partially cylindrical form and provided with a radial through-hole (10) emerging in the seat and permitting the passage, with play, of the threaded rod of a screw (6) intended to interact with the said nut for the assembly of two parts (1, 2). The bearing surfaces opposite the seat and the nut (4) are provided so as to form a pivot joint for taking up any angular offset between the axis (13) of the screw (6) and the axis (14) of the through-hole (10) of the barrel. On its periphery, the nut (4) is provided with means (23) for immobilization in rotation relative to its seat in the barrel (3). The device also comprises means (5) for retaining the nut (4) on the barrel as well as a pair of washers (7, 8) for compensating for a variation in thickness.

11 Claims, 1 Drawing Sheet

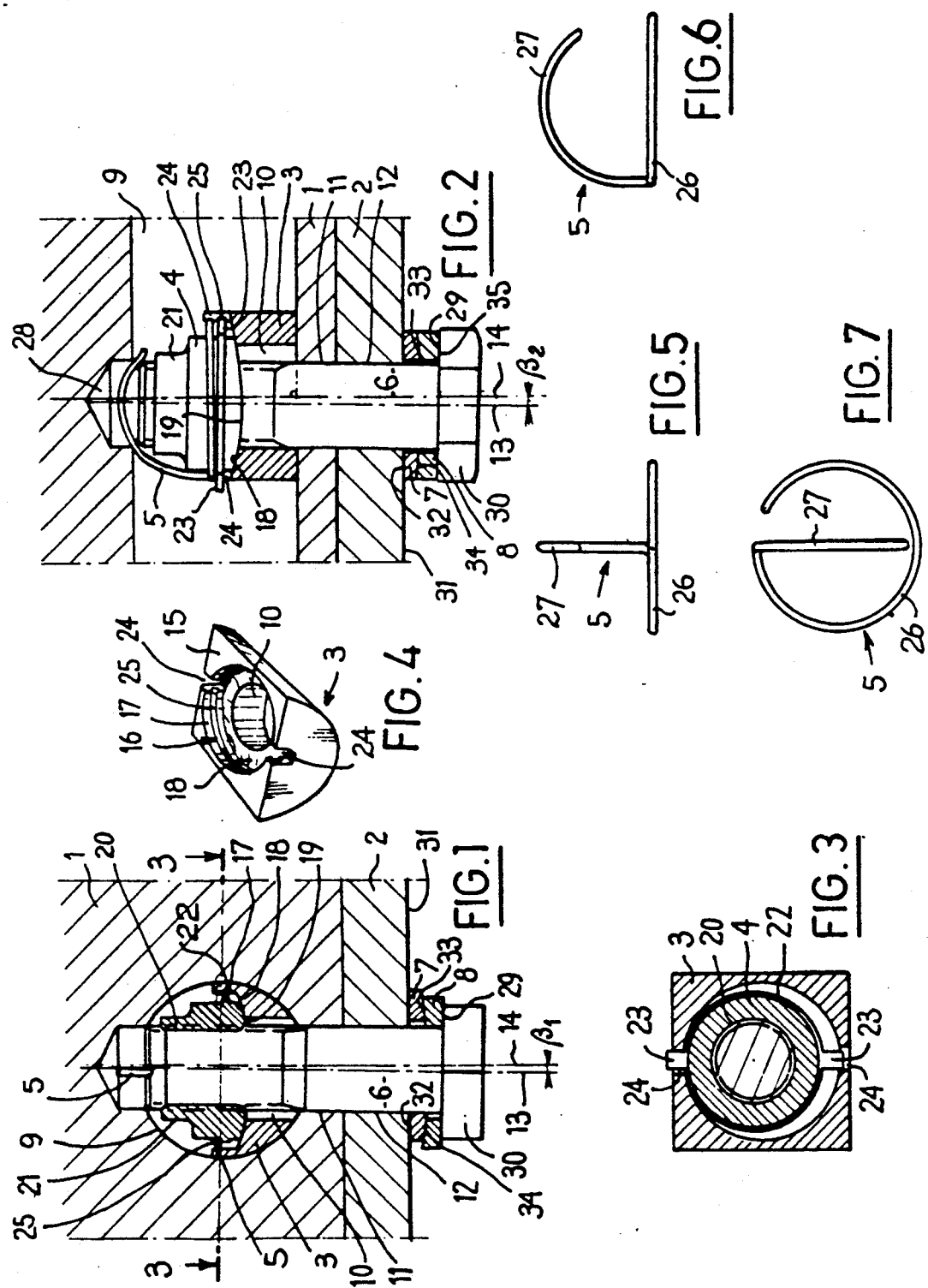

FLOATING BARREL NUT ASSEMBLY DEVICE

The invention relates to barrel nut assembly devices, more particularly to floating barrel nut devices.

Barrel nuts are in common use, particularly in aeronautics. The barrel nut having the simplest form is a cylindrical part equipped with a radial tapped hole. It is placed in a bore made in a first of two parts which it is desired to assemble. This first part is also provided with a screw hole extending perpendicularly to the bore and emerging in the latter.

The other part is provided with a screw through-hole, intended to be disposed opposite the screw hole of the first part in order to permit the passage of a screw intended to interact with the barrel nut in order to tighten the parts against one another.

Such as assembly device offers, in particular, the advantage that the screw can be screwed into the barrel nut without it being necessary to hold the nut, even when the latter is provided with a thread stop, since the barrel is immobilized in the plane perpendicular to the axis of the screw.

The play between the screw and the screw holes made in the two parts to be assembled may be large or small. The lack of centring between the screw holes and the tapped hole of the barrel nut when the latter is in place in the first part must be less than this play.

In point of fact, if the two assembled parts are subjected to forces perpendicular to the axis of the screw, that is to say to a shearing action, it is important that the play between the screw and the screw holes is as small as possible.

If this play is minimal, in order to permit a certain lack of centring between the screw holes and the tapped hole of the barrel nut or, in other words, a lack of coaxiality between the axis of the screw and the axis of the tapped hole, use is made of a member for centring the barrel nut in the bore acting as its housing in the first part.

This centring member, which is simultaneously a member for holding the barrel in a centred position relative to the screw holes, can consist of a steel spring leaf or plate which is shaped so as to have first means interacting with the barrel nut itself and second means adapted in order to interact elastically with the extension of the screw hole perpendicular to the axis of the bore in which the barrel nut must be housed. This centring member can also consist of a thread spring disposed around a boss provided around the tapped hole of the barrel nut in order to interact with the said extension when the barrel nut is positioned.

It is thus possible to dispose the barrel nut in place beforehand in its reception bore and the elastic centring member then holds the body of the barrel nut in position, centred on the screw hole emerging in the bore.

Assembly devices of this type, comprising a floating nut housed in a seat made in the barrel and connected to the latter by guide pins, are also known. The barrel is provided with a circular aperture permitting the passage with play of the screw in order to interact with the nut which can be offset in translation along the axis of the barrel in order to take up a lack of centring between the axis of the tapped hole of the nut and the axis of the screw.

The device comprising a screw housed floating in a barrel does not, however, solve the problem associated with a lack of perpendicularity of the axis of the bore receiving the barrel relative to the axis of the screw holes. In fact, if this lack of perpendicularity is great, the use of a barrel with a floating nut involves a bending moment on the screw. The bending forces thus imposed on the screw cause a deterioration of the fatigue strength of the latter.

A device comprising a barrel with a floating nut in which the barrel and the nut are designed so as to reduce the bending forces when, in a longitudinal plane of the barrel, there is this lack of perpendicularity between the bore receiving the barrel and the screw holes, is also known. To this end, the seat made in the barrel has a partially cylindrical form in order to interact with the bearing face of the nut, which is also cylindrical. The cylindrical surface of the barrel is greater than that of the nut so that the nut can be offset longitudinally relative to the barrel in order to tilt the axis of the nut in order to take up the said lack of perpendicularity in the said longitudinal plane of the barrel.

However, this device has the drawback that, on screwing the screw in the nut, the latter tends to rotate relative to the barrel which is quite inevitable if a thread stop is incorporated in the tapped hole of the nut. This results in the bearing surface of the nut not bearing satisfactorily on the seat in the barrel and this gives rise to additional stresses in the screw and in the nut.

The invention aims to propose a barrel nut assembly device ensuring optimum contact between the nut and the barrel when the screw is engaged with the nut and a taking-up, in all planes, of any lack of perpendicularity of the screw passage holes relative to the bore receiving the barrel.

The subject of the invention is a barrel nut assembly device comprising a nut floatingly housed in a seat made in a barrel of partially cylindrical form and provided with a radial through-hole emerging in the seat and permitting the passage, with play, of the threaded rod of a screw intended to interact with the said nut for the assembly of two parts, characterized in that the opposite bearing surfaces of the seat and of the nut are provided so as to form a ball joint for taking up any angular offset between the axis of the screw and the axis of the through-hole of the barrel, and in that, on its periphery, the nut is provided with means for immobilization in rotation relative to its seat in the barrel.

According to other characteristics of the invention:

the nut has a general cylindrical form, the said immobilization means comprising at least two diametrically opposed radial studs interacting with grooves made in the barrel around the seat;

the depth of the grooves of the barrel is such that a free path is provided between the studs and the bottom of the grooves when the axis of the nut is perpendicular to the axis of the barrel, this free path permitting a slight pivoting of the nut in the plane of the studs without it ceasing to be immobilized in rotation;

retention means are provided in order to retain the nut on its seat in the barrel, the said means comprising an elastic metal wire bent so as to form, on the one hand, a loop and, on the other hand, an arc extending in a plane perpendicular to the plane of the loop, the seat comprising a cylindrical portion forming a bearing surface interacting with the said loop of the retention means;

a pair of washers is provided in order to be slipped over the rod of the screw between the bearing surface of the head of the screw and the outer face of one of the parts to be assembled, the first washer having a plane bearing face intended to be pressed against the outer surface of the said part and a convex face in the form of a spherical zone interacting with a complementary concave face of the second washer, the other bearing face of the second washer being plane in order to be pressed against the beating surface of the head of the screw, the orifice of the washers having a diameter greater than that of the screw so as to provide play between them permitting an axial offset of the washers relative to one another in order to vary the total thickness of the washers radially around the screw.

The invention will now be described in greater detail with reference to the appended drawing, in which:

FIG. 1 is a view in longitudinal section of an assembly device according to the invention, showing two parts held together with the aid of this device, the bore for receiving the barrel nut being shown in transverse section;

FIG. 2 is a view in longitudinal section at 90° relative to FIG. 1, thus showing the reception bore in longitudinal section;

FIG. 3 is a transverse section of the barrel nut along the line 3—3 in FIG. 1;

FIG. 4 is a perspective view of a barrel according to the invention;

FIGS. 5 to 7 are views in lateral elevation in two orthogonal planes and a plan view, respectively, of a member for retaining the nut on the barrel.

FIGS. 1 and 2 show a first part 1 assembled with a second part 2 with the aid of an assembly device according to the invention. In the embodiment illustrated in these figures, the assembly device comprises a barrel 3, a nut 4, means 5 for retaining the nut on the barrel, a screw 6 and washers 7, 8.

The barrel 3 with the nut 4 is disposed in a reception bore 9 made in the first part 1 and extending parallel to one of the faces of the latter.

The barrel 3 has a general hemi-cylindrical form and comprises a radial circular aperture 10 having a diameter greater than that of the screw 6 so that the latter passes through the barrel with play. The radial aperture 10 is brought opposite a screw hole 11 made in the first part and emerging in the bore 9. The hole 11 is aligned with a screw through-hole 12 made in the second part 2 in order to permit the passage of the screw 6 which interacts with the nut 4 through the aperture 10 of the barrel 3. The screw passage holes 11, 12 have a diameter which is slightly greater than that of the screw 6 in order to leave a minimum play between its walls and the screw, which is desirable when the parts 1, 2 are subjected to forces directed perpendicular to the axis of the screw or to shearing forces.

Given that this play is minimal, the screw holes 11 and 12 have to be approximately coaxial with one another but, as illustrated in FIGS. 1 and 2, they can have a lack of perpendicularity relative to the bore 9. This lack of perpendicularity corresponds to an angular offset between the axis 13 of the screw and the axis 14 of the aperture 10 of the barrel 3. In the sectional plane in FIG. 1, this angular offset is referenced $\beta 1$ and in the sectional plane in FIG. 2 it is referenced $\beta 2$.

The barrel 3 has a plane longitudinal surface 15 extending perpendicular to the aperture 10 of the barrel. A recess 16 forming a seat for the nut 4 is made in the plane surface 15 around the aperture 10. The seat comprises a cylindrical portion 17 adjacent to the plane surface and a portion in the form of a spherical zone 18 in which the aperture 10 emerges.

The nut has a general cylindrical form and one of its end faces has a form of a spherical zone 19 disposed around its tapped hole 20. The spherical zone 19 complements the spherical zone 18 of the barrel 3 in order to interact with the latter. These two spherical surfaces define a pivot for taking up the angular offset between the axis 13 of the screw 6 and the axis 14 of the aperture 10, this offset being a consequnece of the lack of perpendicularity, illustrated in FIGS. 1 and 2, between the screw holes 11, 12 end the bore 9 for receiving the barrel 3.

Over part of its length, near its end opposite the spherical zone 19, the nut is narrowed in order to form an axial collar 21 around the tapped hole 20. The collar 21 is deformed elliptically in order to form a thread stop for the screw 6.

The nut 4 also comprises a flange 22 and two diametrically opposed radial studs 23 projecting from the flange. The studs 23 form means for immobilization in rotation of the nut relative to the barrel 3 and interact with grooves 24 made in the plane longitudinal face 15 of the latter, each groove being disposed so as to connect the recess 16 forming a seat with a corresponding end face of the barrel.

The depth of the grooves 24 of the barrel is such that a free path is provided between the studs 23 and the bottom of the grooves when the axis of the nut is perpendicular to the axis of the barrel, which permits a slight pivoting of the nut in its seat 16 without it ceasing to be immobilized in rotation.

The flange 22 interacts with the retention means 5 of the nut and simultaneously limits the pivoting angle of the latter.

In the example illustrated in the figures, the cylindrical portion 17 of the seat 16 comprises a groove 25 interacting with the retention means 5 of the nut 4 on the barrel 3.

The retention means 5 comprise an elastic metal wire bent so as to form, on the one hand, a loop 26 and, on the other hand, an arc 27 extending in a plane perpendicular to the plane of the loop 26.

The loop 26 is housed in the groove 25 of the barrel 3 and the arc 27 extends over the nut 4. The nut is retained in place on its seat in the barrel 3 by the loop 26 which, as already mentioned, interacts with the flange 22 os the nut.

The groove 25 of the barrel 3 is unnecessary if the tension force in the loop is sufficiently great to hold the latter firmly in place while stressing it against the cylindrical portion 17 of the seat 16. The presence of this groove 25 is, however, very advantageous for the positioning of the loop 26 when assembling the barrel nut assembly.

The screw hole 11 is advantageously extended beyond the housing bore 9 in order to form a recess 28 interacting with the arc 27 of the retention means 5 in order to centre the barrel 3 relative to the screw hole 11 and simultaneously hold the barrel nut assembly in place in this centred position.

If the bearing surface 29 of the head 30 of the screw does not extend parallel to the outer surface 31 of the second part 2 because the screw holes 11, 12 are not perfectly perpendicular to this surface 31, it is desirable to take up this angular offset in order to prevent a deterioration of the fatigue strength of the screw.

The angular offset illustrated in FIGS. 1 and 2 is taken up with the aid of the pair of washers 7 and 8 which are washers for compensating a variation in thickness. They comprise a first washer 7 having a plane bearing face 32 pressed against the outer surface 31 of the part 2 and a convex face 33 if the form of a spherical zone interacting with a complementary concave face 34 of a second washer 8. The other bearing face 35 of the second washer 8 is plane and is pressed against the bearing surface 29 of the screw 6.

The orifice of the washers 7, 8 has a diameter greater than that of the screw 6 so that play is provided between the orifice of the washers and the screw. This play permits an offset of the axes of the washers relative to one another in order to vary the total thickness of the washers radially around the screw so that an angular offset of the bearing surface 29 of the screw 6 relative to the outer surface 31 of the second part 2 is compensated for.

The positioning of the assembly device according to the invention is simple. The nut 4 is retained in place on the barrel with the aid of the retention means 5 and the barrel nut assembly is introduced in the bore 9. On introduction, the arc 27 of the retention means 5 is stressed towards the nut 4 by the wall of the bore 9 until it is opposite the recess formed by the extension of the screw hole 11. At this point, the arc 27 is released and stressed elastically towards this recess in order to interact with the latter by snapping for the centring of the barrel nut assembly and for holding the assembly in this position. The barrel nut assembly can thus easily be positioned in a bore even when the latter is disposed vertically.

Next, the screw 6, which can be a standard screw, is introduced through the screw holes 11, 12 until it comes into contact with the nut 4. At this moment, this automatically produces centring of the nut 4 relative to the screw 6 so that the axis of the nut coincides with the axis of the screw. If there is an angular offset between the axis of the screw and the axis of the aperture 10 of the barrel, the nut is brought to pivot slightly on the seat in order to take up the said offset. If this angular offset is the result of a lack of perpendicularity of the screw holes 11, 12 relative to the outer surface 31 of the part 2, it is preferable to interpose a pair of washers 7, 8 for compensating a variation in thickness between the bearing surface 29 of the screw 6 and the said surface.

The screw 6 is then screwed into the nut 4 up to the moment when the desired tightening is obtained. By virtue of the invention, the tightening force is distributed uniformly around the rod of the screw and a deterioration in the fatigue strength of the screw is thus prevented.

I claim:

1. Barrel nut assembly device comprising a nut housed floatingly in a seat made in a barrel of partially cylindrical from and provided with a radial through-hole emerging in the seat and permitting the passage, with play, of the threaded rod of a screw intended to interact with the said nut for the assembly of two parts, wherein opposite bearing surfaces of the seat and of the nut are provided so as to form a ball joint for taking up angular as well as lateral offset in any plane between the axis of the screw and the axis of the through-hole of the barrel, and wherein the nut is provided on its periphery with means for immobilization in rotation relative to its seat in the barrel.

2. Assembly device according to claim 1, in which the nut has a general cylindrical form, characterized in that the said immobilization means comprise at least two diametrically opposed radial studs interacting with grooves made in the barrel around the seat.

3. Assembly device according to claim 2, characterized in that the depth of the grooves of the barrel is such that a free path is provided between the studs and the bottom of the grooves when the axis of the nut is perpendicular to the axis of the barrel, this free path permitting a slight pivoting of the nut in the plane of the studs without it ceasing to be immobilized in rotation.

4. Assembly device according to claim 1, in which a pair of washers is provided in order to be slipped over the rod of the screw between the bearing surface of the head of the screw and the outer face of one of the parts to be assembled, characterized in that the first washer has a plane bearing face intended to be pressed against the outer surface of the said part and a convex face in the form of a spherical zone interacting with a complementary concave face of the second washer, the other bearing face of the second washer being plane in order to be pressed against the bearing surface of the head of the screw, and in that the orifice of the washers has a diameter greater than that of the screw so as to provide play between them permitting an axial offset of the washers relative to one another in order to vary the total thickness of the washers radially around the screw.

5. Barrel nut assembly device comprising a nut housed floatingly in a seat made in a barrel of partially cylindrical form and provided with a radial through-hole emerging in the seat and permitting the passage, with play, of the threaded rod of a screw intended to interact with the said nut for the assembly of two parts, characterized in that the opposite bearing surfaces of the seat and of the nut are provided so as to form a ball joint for taking up any angular offset between the axis of the screw and the axis of the through-hole of the barrel, and in that, on its periphery, the nut is provided with means for immobilization in rotation relative to its seat in the barrel, in which retention means of the nut on its seat in the barrel are provided, characterized in that the said means comprise an elastic metal wire bent so as to form, on the one hand, a loop and, on the other hand, an arc extending in a plane perpendicular to the plane of the loop, and in that the seat comprises a cylindrical portion forming a bearing surface interacting with the said loop of the retention means.

6. Assembly device according to claim 5, characterized in that a groove is provided in the cylindrical portion of the seat and in that the loop of the retention means is housed in the said groove.

7. Assembly device according to claim 5, characterized in that the nut is provided with a flange interacting with the loop of the retention means in order to retain the nut on the seat and to limit the pivoting angle of the nut.

8. Assembly device according to claim 5, characterized in that the arc of the retention means form a member for centering the barrel nut assembly intended to be actuated on positioning of the device in one of the parts to be assembled.

9. Barrel nut assembly device comprising:
a barrel of partially cylindrical shape, having a plane of general symmetry, a seat and a generally radial through-hole emerging in the seat, the through-hole having a general axis contained in said plane, the cylindrical shape defining a cylindrical axis and a cylindrical radius, the seat having a generally spherical surface, the center of said generally spherical surface being on said through-hole general axis and spaced from said cylindrical axis;

a nut floatingly housed in the seat of the barrel, the nut having a generally spherical bearing surface conforming to the generally spherical surface of the seat; and means on the nut for immobilizing the nut from rotation about said through-hole general axis with respect to the seat of the barrel;

whereby, when a screw is inserted with a radial play through said through-hole and screwed into the nut, the generally spherical bearing surface and the generally spherical surface cooperate to accommodate any angular offset between a screw axis and the through-hole general axis.

10. Barrel nut according to claim 9, wherein said center is on a side of said cylindrical axis remote from said through-hole.

11. Barrel nut according to claims 10 wherein said generally spherical surface has a spherical radius, and the spherical raidus is greater than the cylinder radius.

* * * * *